US010300442B2

(12) United States Patent
Wombacher et al.

(10) Patent No.: US 10,300,442 B2
(45) Date of Patent: May 28, 2019

(54) AIR VOID-FORMING MATERIAL FOR CEMENTITIOUS SYSTEMS

(71) Applicant: SIKA TECHNOLOGY AG, Baar (CH)

(72) Inventors: Franz Wombacher, Jonen (CH); Christian Bürge, Schafisheim (CH); Christophe Kurz, Endingen (CH); Marc Schmutz, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/426,068

(22) PCT Filed: Oct. 14, 2013

(86) PCT No.: PCT/EP2013/071423
§ 371 (c)(1),
(2) Date: Mar. 4, 2015

(87) PCT Pub. No.: WO2014/060352
PCT Pub. Date: Apr. 24, 2014

(65) Prior Publication Data
US 2015/0231585 A1 Aug. 20, 2015

(30) Foreign Application Priority Data

Oct. 15, 2012 (EP) ..................................... 12188533

(51) Int. Cl.
 *C04B 38/10* (2006.01)
 *B01F 17/00* (2006.01)
 *C04B 28/02* (2006.01)
 *C04B 40/00* (2006.01)
 C04B 103/30 (2006.01)
 C04B 103/50 (2006.01)

(52) U.S. Cl.
 CPC ...... *B01F 17/0085* (2013.01); *B01F 17/0028* (2013.01); *C04B 28/02* (2013.01); *C04B 38/10* (2013.01); *C04B 40/0039* (2013.01); *C04B 2103/304* (2013.01); *C04B 2103/50* (2013.01)

(58) Field of Classification Search
 CPC ............ C04B 40/0039; C04B 2103/50; C04B 2103/304
 See application file for complete search history.

(56) References Cited

U.S. PATENT DOCUMENTS 3,489,582 A * 1/1970 Johansson ............. C04B 20/008
 106/724
4,065,402 A * 12/1977 Satterwhite ........ B01D 19/0404
 516/126
4,151,127 A * 4/1979 Perner ................ B01D 19/0404
 510/233
6,358,310 B1 * 3/2002 Berke ..................... C04B 24/32
 106/724

8,187,376 B2 * 5/2012 Kuo ........................ C04B 28/02
 106/808
8,317,918 B1 * 11/2012 Kuo ........................ C04B 28/02
 106/808
2005/0171325 A1 * 8/2005 Matsui ................ C04B 24/2658
 528/272
2009/0134354 A1 5/2009 Dubois et al.
2009/0275679 A1 * 11/2009 Flanigan ............... C08L 95/005
 524/2
2011/0034572 A1 2/2011 Mueller
2011/0290158 A1 * 12/2011 Kuo ........................ C04B 28/02
 106/808
2012/0291676 A1 * 11/2012 Kuo ........................ C04B 28/02
 106/808
2013/0096240 A1 4/2013 Flanigan
2015/0231585 A1 * 8/2015 Wombacher ........ B01F 17/0085
 106/820
2016/0207830 A1 * 7/2016 Burge ..................... C04B 22/04

FOREIGN PATENT DOCUMENTS

| CH | 689619 A5 | 7/1999 |
|---|---|---|
| DE | 19528912 A1 | 2/1996 |
| DE | 102008018802 A1 | 10/2009 |
| EP | 0 405 306 A1 | 1/1991 |
| GB | 2 292 141 A | 2/1996 |
| JP | S61-270247 A | 11/1986 |
| JP | H03-232751 A | 10/1991 |
| JP | H08-059320 A | 5/1996 |
| JP | 2006-511418 A | 4/2006 |
| JP | 2012-210604 A | 11/2012 |
| WO | 95/26936 A1 | 10/1995 |
| WO | 2004/056445 A1 | 7/2004 |
| WO | 2009134354 A1 | 11/2009 |
| WO | 2011149714 A1 | 12/2011 |

OTHER PUBLICATIONS

May 10, 2016 Office Action issued in European Patent Application No. 13 779 785.8.
Apr. 21, 2015 International Preliminary Report on Patentability issued in International Patent Application No. PCT/EP2013/071423.
Oct. 20, 2016 Office Action issued in European Patent Application No. 13779785.8.
May 23, 2017 Office Action issued in Japanese Patent Application No. 2015-536175.
Sep. 22, 2017 Office Action issued in European Patent Application No. 13 779 785.8.
Jan. 23, 2018 Office Action issued in Japanese Patent Application No. 2015-536175.

(Continued)

*Primary Examiner* — Michael A Salvitti
(74) *Attorney, Agent, or Firm* — Oliff PLC

(57) ABSTRACT

An air void-forming agent, more particularly for cementitious systems, contains at least one air void-forming material with foaming effect, at least one air void-forming material with defoaming effect, and water.

18 Claims, No Drawings

(56) References Cited

OTHER PUBLICATIONS

May 24, 2018 Office Action Issued in European Patent Application No. 13 779 785.8.
Sep. 11, 2018 Office Action issued in Japanese Patent Application No. 2015-536175.
Feb. 3, 2014 International Search Report issued in International Patent Application No. PCT/EP2013/071423.
Schülke: "grtoan TK 5 Plus data sheet"; Schülke; 2010; XP002697383; Retrieved from the Internet: URL:http://www.schuelke.com/download/pdf/G rotan TK 5 Plus ZTM P BE E EN.pdf

* cited by examiner

AIR VOID-FORMING MATERIAL FOR CEMENTITIOUS SYSTEMS

TECHNICAL FIELD

The invention relates to air void-forming materials for cementitious systems.

PRIOR ART

Cementitious systems, such as concrete and mortar, have to be aerated, for example, in order to improve the processability or to achieve a sufficient resistance to de-icing salts. Usually, this is achieved by incorporating an air void-forming agent in the liquid mixture. The process of mixing the cementitious system leads to the formation of air voids in the range of 10-250 µm, which are stabilized by the addition of the air void-forming agent. Systems that are resistant to de-icing salt, in particular, must have sufficient air voids in the range of approximately 10-250 µm. Otherwise, the cementitious system has insufficient expansion space for the ice crystals that form during cooling to temperatures below 0° C., which can lead to spalling and even destruction of the system.

Various air void-forming materials are known from the prior art, for example, various cationic, anionic and nonionic surfactants or also tall oil (see WO 95/26936, CH 689619 and DE 195 28 912, for example). However, the known air void-forming materials have different disadvantages such as, for example, foaming over time, defoaming over time, and particularly within the first minutes after mixing, a modification of the air void structure over time, different sensitivities or poor compatibilities with respect to plasticizers, other concrete additives and other binders, such as fly ash and slag, as well as a different air content depending on the mixing duration and the mixing type.

DESCRIPTION OF THE INVENTION

The invention is based on the problem of overcoming the above-described problems. Novel air void-forming materials which have special and advantageous properties need to be made available. In particular, air void-forming materials need to be provided which allow the introduction of a constant air void content. Furthermore, stable air voids need to be obtained. It would also be desirable to provide an air void-forming material which is not dependent on the use of different particle-size distributions, the use of different plasticizers (superplasticizers), the use of different mixer types, the use of different supplements, and the use of different binder compositions.

The above problem is solved by an air void-forming agent that contains at least one air void-forming material with foaming effect, at least one air void-forming material with defoaming effect, and water. The core of the invention accordingly is an air void-forming agent which contains at least two different air void-introducing substances which have opposite behaviors with regard to foaming during the mixing.

The invention also relates to the use of the air void-forming agent according to the invention for the formation of air voids in cementitious systems.

Ways of Carrying Out the Invention

The present invention relates to an air void-forming agent which contains at least one air void-forming material with foaming effect, at least one air void-forming material with defoaming effect, and water.

Foaming here means that an increase in the air content occurs within 40 minutes after the end of the mixing process. Defoaming means that, within 40 minutes after the end of the mixing process, the air content is decreased (in each case measured according to DIN EN 1015-7).

Foaming thus leads to an increase in the introduction of air during the mixing, i.e., the stability is increased, while defoaming decreases the introduction of air, i.e., a destabilization of the air voids occurs.

This combination of air void-forming materials with different effects leads to an adaptive, universally usable, air void-forming agent. When combining the air void-forming substances, it is important to ensure that no air void-forming materials with neutral behavior with regard to foaming or defoaming are used, and that, instead, air void-forming materials with foaming effect and air void-forming materials with defoaming effect are combined in such a manner that the overall result is a neutral behavior.

The use of the air void-forming agent according to the invention leads, in particular, to a more robust air introduction and to more stable air voids. Above all, using the air void-forming agent according to the invention it is also possible to minimize or eliminate the dependency of the air void quantity and the air void size on the cement or mortar type, on the aggregate and the grain composition, on the mixer type, on the mixing duration, on the temperature and on the mixing intensity. The dependency on additional substances used, such as, for example, on the binder and on the superplasticizer, can be drastically reduced by means of the air void-forming agent according to the invention.

In a preferred embodiment, the effect of the at least one air void-forming material with foaming effect and the effect of the at least one air void-forming material with defoaming effect cancel each other out. Cancelling each other out here means that the air content changes within 40 minutes after the end of the mixing process by not more than 20% (relative) of the original air content (measured according to DIN EN 1015-7). It is particularly preferable for the air content to change by not more than 10% (relative) of the original air content, very particularly preferably by not more than 5% (relative) of the original air content.

With regard to the air void-forming material with foaming effect and the air void-forming material with defoaming effect, it is pointed out first that, depending on the cementitious system used, the same substance can be used both as air void-forming material with foaming effect and also of air void-forming material with defoaming effect. This means that the same substance can be used as air void-forming material with foaming effect in one system and as air void-forming material with defoaming effect in another system. Naturally, the same substance in the same system can have only one of the two possible effects.

In principle, it is possible to use any known air void-forming material as air void-forming material with foaming effect in the air void-forming agent according to the invention. However, it is advantageous if said air void-forming material is a tall oil, an anionic surfactant and/or fatty acids. It is particularly preferable to use distilled tall oil. Said tall oil has the advantage that it has a particularly defined and stable composition. It is particularly preferable to use a fatty acid fraction of distilled tall oil. The use of distilled tall oil in the form of Sylvatal 25/30, which is commercial available at Chemische Fabrik Schweizerhall, is very particularly preferable. As air void-forming material with foaming effect, it is also preferable to use fatty alcohol sulfates, in particular anionic fatty alcohol sulfates, amino acid derivatives, in particular anionic amino acid derivatives, for example, sarcosinates, olefin sulfonates, in particular anionic olefin sulfonates, sulfosuccinamates, in particular anionic sulfosuccinamates.

In addition, as air void-forming material with foaming effect, it is possible to use phosphates, in particular anionic phosphates, amphoteric compounds, for example, cocamidopropylbetaines, alkylphenol ethoxylates, in particular nonionic alkylphenol ethoxylates, amide ethoxylates, in particular, nonionic amide ethoxylates, amine ethoxylates, in particular nonionic amine ethoxylates.

In particular, the air void-forming material with foaming effect contains at least one unsaturated fatty acid, preferably at least one polyunsaturated fatty acid. It is also advantageous to use mixtures containing several different fatty acids, in particular mixtures of at least one monounsaturated fatty acid and at least one polyunsaturated fatty acid. For example, mixtures containing linoleic acid and oleic acid, optionally with resin acids, are suitable. It is preferable for the fatty acids to originate here from tall oil and/or distilled tall oil.

In a preferred embodiment, the air void-forming agent according to the invention contains two air void-forming materials with foaming effect. This leads to the advantage that the sensitivity to aggregates, additives and other influences is reduced.

If two air void-forming materials with foaming effect are used in the air void-forming agent according to the invention, then it is advantageous if, in addition to tall oil, preferably distilled tall oil, a surfactant, preferably an anionic surfactant, in particular a lauryl ether sulfate, is used. The use of this combination has the additional advantage that the sensitivity to aggregates, additives and other influences is reduced.

In a preferred embodiment, a surfactant, advantageously an anionic surfactant, and particularly preferably a basic anionic surfactant is used as air void-forming material with defoaming effect. It is obvious that, if the air void-forming material with defoaming effect is, for example, an anionic surfactant, then the latter cannot at the same time be an air void-forming material with foaming effect in a given cementitious system. As air void-forming material with defoaming effect, it is also preferable to use fatty alcohol ether sulfates, in particular, anionic fatty alcohol ether sulfates, and alcohol ethoxylates, in particular nonionic alcohol ethoxylates.

In addition, as air void-forming material with defoaming effect, phosphates, in particular, anionic phosphates, amphoteric compounds, for example, cocamidopropylbetaines, alkylphenol ethoxylates, in particular nonionic alkylphenol ethoxylates, amide ethoxylates, in particular nonionic amide ethoxylates, and amine ethoxylates, in particular, nonionic amine ethoxylates, can be used.

The ratio of the at least one air void-forming material with foaming effect to the at least one air void-forming material with defoaming effect in the air void-forming agent according to the invention is in principle variable and depends on the material and apparatuses used. However, it has been shown that it is advantageous if this ratio is 10:90 to 90:10, preferably 30:70 to 70:30. The ratio is preferably selected so that a use of the air void-forming agent according to the invention with slag and/or fly ash is possible and so that the negative influence of carbon particles is masked. The latter feature decreases the sensitivity of the air voids to carbon.

In a particularly preferred embodiment, the air void-forming agent according to the invention contains a substance for increasing the solubility, preferably a stabilizer, a complexing agent, very particularly preferably nitrilotriacetic acid, a solubilizer and/or a pH-modifying substance, particularly preferably a lye and very particularly preferably sodium hydroxide lye. The use of the lye stabilizes the air void-forming agent according to the invention.

In a preferred embodiment, the air void-forming agent according to the invention contains a preservative. In principle, any known preservative can be used; however, the use of preservatives that cleave off formaldehyde is particularly preferable.

It is particularly preferable to use an air void-forming agent which contains 0.02 to 6% by weight, in particular 0.2 to 6% by weight, of the at least one air void-forming material with foaming effect, 0.02 to 6% by weight, in particular 0.2 to 6% by weight, of the at least one air void-forming material with defoaming effect, 80 to 99.9% by weight of water, optionally 0.02 to 2.5% by weight of lye, and optionally 0.01 to 0.5% by weight of preservative.

In a particularly preferable embodiment, the air void-forming agent according to the invention contains 0.02 to 5.0% by weight, in particular 0.2 to 5.0% by weight, of the at least one air void-forming agent with foaming effect, 0.02 to 5.0% by weight, in particular 0.2 to 5.0% by weight, of the at least one air void-forming agent with defoaming effect, 80 to 99.9% by weight of water, optionally 0.05 to 1.0% by weight of lye, and optionally 0.01 to 0.5% by weight of preservative. Such an agent has the additional advantage of a low sensitivity to the particle-size distribution and/or the mixer type during the air introduction.

The present invention also relates to the use of the above-described air void-forming agent according to the invention for forming air voids in cementitious systems, preferably in concrete and mortar mixtures.

The air void-forming agent according to the invention can be used for forming air voids in all the known cementitious systems. The cementitious systems are preferably concrete or mortar mixtures.

The present invention further relates to the use of the above-described air void-forming agent according to the invention for forming air voids in cementitious systems, preferably in concrete and mortar mixtures.

Here, cementitious system denotes a system that contains a cementitious binder. A cementitious binder in the present case denotes in particular a binder or a binder composition with a content of at least 5% by weight, in particular at least 20% by weight, preferably at least 35% by weight, very particularly preferably at least 65% by weight, of cement clinker. The cement clinker is preferably a Portland cement clinker. In the present context, cement clinker refers in particular to ground cement clinker.

In particular, the mineral binder contains a hydraulic binder, preferably cement. A cement with a cement clinker content of >35% by weight is particularly preferable. The cement of type CEM I, CEM II and/or CEM IIIA (according to the standard EN 197-1) is particularly preferable. The mineral binder content of the entire hydraulic binder is advantageously at least 5% by weight, in particular at least 20% by weight, preferably at least 35% by weight, and very particularly preferably at least 65% by weight. According to an additional advantageous embodiment, the mineral binder consists of >95% by weight of hydraulic binder, in particular of cement clinker.

However, it can also be advantageous for the binder to contain or consist of other binders. They are in particular latent hydraulic binders and/or pozzolanic binders. Suitable latent hydraulic and/or pozzolanic binders are, for example, slag, fly ash and/or silica dust. It is equally possible for the binder to contain inert substances such as limestone, quartz meals and/or pigments, for example.

In an advantageous embodiment, the mineral binder contains 5-95% by weight, in particular 5-65% by weight, particularly preferably 15-35% by weight, latent hydraulic and/or pozzolanic binder(s). Advantageous latent hydraulic and/or pozzolanic binders are slag and/or fly ash.

In a particularly preferable embodiment, the mineral binder contains a hydraulic binder, in particular cement or cement clinker, and a latent hydraulic and/or pozzolanic binder, preferably slag and/or fly ash. The content of the latent hydraulic and/or pozzolanic binder here is particularly preferably 5-65% by weight, particularly preferably 15-35% by weight, while the content of the hydraulic binder is at least 35% by weight, particularly preferably at least 65% by weight.

In the context of the present invention, a "mineral binder" is considered to be equivalent to a "mineral binder composition" The same also applies to the expression cementitious binder.

In a preferred embodiment, the cementitious systems, preferably the concrete and mortar mixtures, contain a plasticizer. As plasticizer one can use, for example, polycarboxylate ethers, vinyl copolymers, melamine- or naphthaline-formaldehyde condensates, lignin sulfonates or carbohydrates, wherein the use of polycarboxylate ether-containing superplasticizers is particularly preferable, since a higher water reduction can be achieved with the polycarboxylate ether-containing superplasticizers. According to the present invention, polycarboxylate ethers are not suitable as air void-forming materials and should not be considered to be air void-forming materials. The plasticizer is preferably used in a quantity of 0.5 to 1.5% by weight, particularly preferably in a quantity of 0.6 to 1.2% by weight.

The water/cement ratio in the cementitious system in which the air void-forming agent according to the invention is introduced for the formation of air voids is preferably 0.2 to 0.8, and particularly preferably to 0.4 to 0.7.

In another preferable embodiment, the air void-forming agent according to the invention is used in a quantity of 0.1 to 2% by weight, preferably of 0.2 to 1.2% by weight relative to the binder content of the cementitious system.

Embodiment Examples

1. Preparation of the Air Void-Forming Agent According to the Invention

Two air void-forming agents (LM 1 and LM 2) were prepared according to Table 1. Here, the preparation was started with water, to which Sylvatal 25/30 and Rewopol TS 35 H were added, and the preparation was mixed. Subsequently, sodium hydroxide lye was added and the preparation was mixed again. Finally, Texapon NSO approximately 28%, Grotan TK 5 PLUS, and, depending on the formulation, nitrilotriacetic acid were added, and the preparation was mixed again.

TABLE 1

Composition of the air void-forming agents (LM 1 and LM 2) in % by weight relative to the total weight of the air void-forming agent

|  | LM 1 | LM 2 |
| --- | --- | --- |
| Sylvatal 25/30 | 0.08% | 1.80% |
| Rewopol TS 35 H | 0.24% | 5.40% |
| Texapon NSO approximately 28% | 0.15% | 3.38% |
| Sodium hydroxide lye 50% | 0.22% | 0.48% |
| Nitrilotriacetic acid |  | 0.25% |

TABLE 1-continued

Composition of the air void-forming agents (LM 1 and LM 2) in % by weight relative to the total weight of the air void-forming agent

|  | LM 1 | LM 2 |
| --- | --- | --- |
| Municipal water | 99.16% | 87.17% |
| Grotan TK 5 PLUS | 0.15% | 0.15% |

Sylvatal 25/30 is a distilled tall oil (available from Chemische Fabrik Schweizerhall)

Rewopol TS 35 H is an anionic surfactant (available from Goldschmidt GmbH)

Texapon NSO is a sodium lauryl ether sulfate (available from Cognis GmbH)

Grotan TK 5 PLUS is a preservative (available from THOR GmbH)

Nitrilotriacetic acid is a complexing agent (available from BASF)

2. Mortar and Concrete Tests

The following mixtures (particle-size distributions) were prepared:

Standard Mortar:

750 g cement (1:1:1 mixture of Normo4 Holcim Switzerland, CEM I 42.5N Jura Cement Switzerland, CEM I 42.5N Vigier Switzerland)

141 g limestone filler (Nekafill, Tetstal AG, Switzerland)

738 g 0-1 mm sand (Kieswerk Hauser AG, Switzerland)

1107 g 1-4 mm gravel (Kieswerk Hauser AG, Switzerland)

1154 g 4-8 mm gravel (Sakret AG, Switzerland)

Preparation variant A: The sand, the gravel, the filler and the cement were mixed for 1 minute in a pugmill mixer (Hobart A200N). The plasticizer and the air void-forming agent(s) were added to the mixing water and the latter was added to the sand, gravel, filler and cement under stirring within 3 minutes. The water/cement content (w/c value) was between 0.42 and 0.70.

Preparation variant B: The sand, the gravel, the filler and the cement were mixed for 1 minute in a tumbler mixer (50 kg DEMA concrete mixer GBM 50). The plasticizer and the air void-forming agent(s) were added to the mixing water and the latter was added to the sand, gravel, filler and cement under stirring within 3 minutes. The water/cement content (w/c value) was between 0.42 and 0.44.

SCC (Self-Compacting Concrete):

820 g cement (1:1:1 mixture of Normo4 Holcim Switzerland, CEM I 42.5N Jura Cement Switzerland, CEM I 42.5N Vigier Switzerland)

80 g fly ash (Saffament, Safa Saarfilterasche-Vertriebs-GmbH & Co. KG Germany)

1300 g limestone filler (Nekafill, Tetstal AG, Switzerland)

1450 g 0-1 mm sand (Kieswerk Hauser AG, Switzerland)

1800 g 1-4 mm gravel (Kieswerk Hauser AG, Switzerland)

Preparation: The sand, the gravel, the filler and the cement were mixed for 1 minute in a pugmill mixer (Hobart A200). The plasticizer and the air void-forming agent(s) were added to the mixing water and the latter was added to the sand, gravel, filler and cement under stirring within 3 minutes. The water/cement content (w/c value) was between 0.42 and 0.70.

Concrete:

7.5 kg cement (1:1:1 mixture of Normo4 Holcim Switzerland, CEM I 42.5N Jura Cement Switzerland, CEM I 42.5N Vigier Switzerland)

2.0 kg limestone filler (Nekafill, Tetstal AG, Switzerland)
7.0 g 0-1 mm sand (Kieswerk Hauser AG, Switzerland)
10.5 kg 1-4 mm gravel (Kieswerk Hauser AG, Switzerland)
7.5 kg 4-8 mm gravel (Sakret AG, Switzerland)
7.5 kg 8-16 mm gravel (Sakret AG, Switzerland)
15.0 kg 16-32 mm gravel (Sakret AG, Switzerland)

Preparation Variant A: The sand, the gravel, the filler and the cement were mixed for 30 seconds in a pugmill mixer (Zyklos). The plasticizer and the air void-forming agent(s) were added to the mixing water and the latter was added to the sand, gravel, filler and cement under stirring within 3 minutes. The water/cement content (w/c value) was between 0.45.

Preparation Variant B: The sand, the gravel, the filler and the cement were mixed for 30 seconds in a pugmill mixer (Zyklos). The plasticizer and the air void-forming agent(s) were added to the mixing water and the latter was added to the sand, gravel, filler and cement under stirring within 3 minutes. The water/cement content (w/c value) was between 0.45.

In the following example, the flow spread (FS) was determined in mm after 40 and 60 minutes [min] according to DIN EN 1015-3, the air content was determined in % according to DIN EN 1015-7, and the separation factors (SF) in mm and the specific surface area (SSA) in $mm^{-1}$ were determined according to DIN EN 480-11. A flow spread (FS) of 160 mm or more for the standard mortar or a slump flow for SCC as well as a flow spread of 40 cm or more for concrete indicate a good processability. A separation factor of less than 0.25 mm as well as a specific surface area of more than 25 $mm^{-1}$ indicate a very good resistance to de-icing salts.

3. Examples

Below, the invention is explained in further detail by means of embodiment examples. Naturally the invention is not limited to these examples.

3.1. The flow spread and the air content of standard mortar (prepared according to Preparation Variant A) with three different air void-forming materials and a polycarboxylate ether as plasticizer were determined (tumbler mixer). The results can be obtained from Table 2 and they show that the use of Texapon NSO CA and Sylvatal 25/40 leads to foaming, whereas the use of Rewopol TS 35 H leads to a slight defoaming. The examples listed in Table 2 are not according to the invention.

TABLE 2

| Polycarboxylate ether | w/c | Air void-forming material | Concentration (% by weight) | FS t = 0 min | FS t = 40 min | Air content t = 0 min | Air content t = 40 min |
| --- | --- | --- | --- | --- | --- | --- | --- |
| Sika ViscoCrete 20HE, 0.5% | 0.42 | Texapon NSO CA 28% (1% solution) | 0.06 | 190 | 179 | 9.2 | 12.6 |
| Sika ViscoCrete 20HE 0.5% | 0.42 | Rewopol TS 35 H (1% solution) | 0.10 | 197 | 183 | 10.3 | 7.6 |
| Sika ViscoCrete 20HE 0.5% | 0.42 | Sylvatal 25/30 (1% solution) | 0.10 | 192 | 181 | 7.1 | 14.2 |

Sika ViscoCrete 20HE is a polycarboxylate ether (available from Sika Schweiz AG).

3.2. The flow spread and the air content of different particle-size distributions (standard mortars prepared according to Preparation Variant A) with the air void-forming material LM 1 according to the invention and a polycarboxylate ether as plasticizer were determined. The results can be obtained from Table 3 and show that the use of the air void-forming material LM 1 according to the invention has hardly any influence on the air content and the air void quality even in the case of a change of the particle-size distribution.

TABLE 3

| Particle-size distribution | Polycarboxylate ether | w/c | Air void-forming material | Concentration (% by weight) | FS t = 0 min | FS t = 60 min | Air content t = 0 min | Air content t = 60 min |
| --- | --- | --- | --- | --- | --- | --- | --- | --- |
| Standard mortar | Sika ViscoCrete 3010S 0.8% | 0.42 | LM 1 | 0.42 | 202 | 188 | 9 | 9.3 |
| Standard mortar without limestone filler | Sika ViscoCrete 3010S 0.8% | 0.41 | LM 1 | 0.25 | 219 | 201 | 10.3 | 10.3 |
| SCC | Sika ViscoCrete 3010S 2.0% | 0.70 | LM 1 | 0.21 | 300* | 215* | 9.1 | 9.6 |

Sika ViscoCrete 3010S is a polycarboxylate ether (available from Sika Schweiz AG)
*slump flow 3.3. The flow spread and the air content of standard mortar (prepared according to Preparation Variant B) with different air void-forming materials and with a polycarboxylate ether as plasticizer were determined (gravitational mixer). The results can be obtained from Table 4 and show that the air content, in the case of the use of the air void-forming agent according to the invention, changes hardly at all, whereas the use of known air void-forming materials, all of which represent 1-component systems, leads to foaming.

TABLE 4

| Polycarboxylate ether | w/c | Air void-forming material | Concentration (% by weight) | FS t = 0 min | FS t = 40 min | Air content t = 0 min | Air content t = 40 min |
|---|---|---|---|---|---|---|---|
| Sika ViscoCrete 3010S 0.8% | 0.42 | a) | | 197 | 161 | 4.5 | 5.1 |
| Sika ViscoCrete 3010S 0.8% | 0.42 | LM 1 b) | 0.42 | 202 | 188 | 9.0 | 9.3 |
| Sika ViscoCrete 3010S 0.8% | 0.42 | Sika FroV-5A c) | 0.20 | 168 | 193 | 9.0 | 16.0 |
| Sika ViscoCrete 3010S 0.8% | 0.42 | Sika Aer S-60 d) | 0.10 | 197 | 194 | 8.6 | 15.1 |
| Sika ViscoCrete 3010S 0.8% | 0.42 | Micro Air G e) | 0.20 | 210 | 193 | 9.8 | 10.7 | a) no air void-forming materials (control)
b) LM 1 = according to the invention
c)-e) Known air void-forming agents (1-component systems); not according to the invention:
c) SikaFroV-5A = (available from Sika Schweiz AG)
d) Sika AER S-60 = (available from Sika Schweiz AG)
e) Micro Air G = (available from Sika BASF)

3.4. The flow spread and the air content of standard mortars (prepared according to Preparation Variant B) with different air void-forming agents and with a polycarboxylate ether as plasticizer were determined (tumbler mixer, turning slowly). The results can be obtained from Table 5 and again show that the air content, in the case of the use of the air void-forming agent according to the invention, changes hardly at all, whereas the use of known air void-forming materials, all of which represent 1-component systems, leads to foaming.

TABLE 5

| Polycarboxylate ether | w/c | Air void-forming agent | Concentration (% by weight) | FS t = 0 min | FS t = 40 min | Air content t = 0 min | Air content t = 40 min |
|---|---|---|---|---|---|---|---|
| Sika ViscoCrete 3010S 0.8% | 0.44 | | | 196 | 141 | 2.6 | 3.6 |
| Sika ViscoCrete 3010S 0.8% | 0.44 | LM 1 | 0.42 | 212 | 174 | 10.3 | 9.8 |
| Sika ViscoCrete 3010S 0.8% | 0.44 | Micro Air G | 0.2 | 191 | 160 | 8.9 | 13.8 |

3.5. The flow spread, the air content, the specific surface area and the separation factor of standard mortars (prepared according to Preparation Variant A) with different air void-forming materials and with a polycarboxylate ether as plasticizer were determined (Hobart A200N mixer). The results can be obtained from Table 6 and show that the air content, in the case of the use of the air void-forming agent according to the invention, changes hardly at all, whereas the use of known air void-forming materials, all of which represent 1-component systems, leads to foaming. The values for the specific surface area (SSA) and the separation factors (SF) show that, in the case of the use of the air void-forming material according to the invention, the mortar or concrete presents a good resistance to de-icing salts.

TABLE 6

| Polycarboxylate ether | w/c | Air void-forming material | Concentration (% by weight) | FS t = 0 min | FS t = 60 min | Air content t = 0 min | Air content t = 60 min | SSA t = 0 min | SSA t = 60 min | SF t = 0 min | SF t = 60 min |
|---|---|---|---|---|---|---|---|---|---|---|---|
| Sika ViscoCrete 3010S 0.8% | 0.43 | MicroAir G | 0.5 | 197 | 172 | 9.7 | 11.7 | 38.5 | 53.2 | 0.07 | 0.04 |
| Sika ViscoCrete 3010S 0.8% | 0.43 | Fro-V5-A | 0.2 | 196 | 173 | 8.2 | 9.9 | 37.6 | 43.6 | 0.10 | 0.07 |
| Sika ViscoCrete 3010S 0.8% | 0.43 | Aer S-30 | 0.4 | 213 | 188 | 8.8 | 9.3 | 23.7 | 28.7 | 0.2 | 0.16 |
| Sika ViscoCrete 3010S 0.8% | 0.43 | Aer S-60 | 0.4 | 212 | 180 | 8 | 12.3 | 37.8 | 47.3 | 0.1 | 0.06 |
| Sika ViscoCrete 3010S 0.8% | 0.43 | LM 1 | 0.5 | 202 | 188 | 9 | 9.3 | 31.1 | 26.3 | 0.14 | 0.17 |

3.6. The flow spread and the air content of different particle-size distributions with the air void-forming agent LM 1 according to the invention and with a polycarboxylate ether as plasticizer were determined using different mixer types. The results can be obtained from Table 7 and show that, in the case of the use of the air void-forming agent according to the invention, different particle-size distributions as well as different mixer types, do not influence the quality of the introduction of air.

TABLE 7

| | | Polycarboxylate ether | w/c | Air void-forming material | Concentration (% by weight) | FS t = 0 min | FS t = 60 min | Air content t = 0 min | Air content t = 60 min |
|---|---|---|---|---|---|---|---|---|---|
| 1 | Concrete (tumbler mixer) | Sika ViscoCrete 3010S (0.8%) | 0.45 | LM 1 | 0.45 | 56 | 46 | 6.5 | 5.8 |
| 2 | Concrete (pugmill mixer) | Sika ViscoCrete 3010S (0.8%) | 0.45 | LM 1 | 0.45 | 52 | 46 | 7.3 | 6.9 |
| 3 | Standard mortar (tumbler mixer) | Sika ViscoCrete 3010S (0.8%) | 0.42 | LM 1 | 0.50 | 202 | 188 | 9 | 9.3 |
| 4 | Standard mortar (Hobart) | Sika ViscoCrete 3010S (0.8%) | 0.43 | LM 1 | 0.50 | 214 | 184 | 10.9 | 11.2 |

1: Prepared according to Production Variant B
2: Prepared according to Production Variant A
3: Prepared according to Production Variant B
4: Prepared according to Production Variant A 3.7. The influence of the superplasticizers on the flow spread and on the air content of standard mortars (prepared according to Preparation Variant B) with different air void-forming materials was determined (50 kg tumbler mixer "Stabilo concrete mixer 6BM50").

The results can be obtained from Table 8 and show that, in the case of the use of the air void-forming agent according to the invention, the air content remains nearly constant, whereas the use of known air void-forming agents, all of which represent 1-component systems, leads to foaming or skimming.

TABLE 8

| Polycarboxylate ether | w/c | Air void-forming material | Concentration (% by weight) | FS t = 0 min | FS t = 40 min | Air content t = 0 min | Air content t = 40 min |
|---|---|---|---|---|---|---|---|
| Sika ViscoCrete 20HE, 0.5% | 0.40 | | | 205 | 158 | 3.7 | 4.7 |
| Sika ViscoCrete 20HE 0.5% | 0.40 | LM 1 | 0.50 | 210 | 163 | 9.0 | 9.1 |
| Sika ViscoCrete 20HE 0.5% | 0.40 | Sika FroV-5 | 0.15 | 196 | 147 | 5.0 | 7.9 |
| Sika ViscoCrete 20HE 0.5% | 0.40 | Sika Aer S-30 | 0.22 | 197 | 142 | 8.0 | 5.7 |
| Sika ViscoCrete 20HE 0.5% | 0.40 | Sika Aer S-60 | 0.14 | 195 | 140 | 4.9 | 8.4 |

Sika ViscoCrete 20HE is a polycarboxylate ether (available from Sika Schweiz AG).
Sika Aer S = 30 = (available from Sika Schweiz AG)
Sika Aer S = 60 = (available from Sika Schweiz AG)

The invention claimed is:

1. Air void-forming agent, comprising:
   at least one air void-forming material with foaming effect selected from the group consisting of tall oil, fatty acids, anionic surfactants, fatty alcohol sulfates, amino acid derivatives, phosphates, amphoteric compounds, alkylphenol ethoxylates, amide ethoxylates, and amine ethoxylates,
   at least one air void-forming material with defoaming effect selected from the group consisting of fatty alcohol ether sulfates, phosphates, amphoteric compounds, amide ethoxylates, and amine ethoxylates, and
   water,
   wherein:
      the at least one air void-forming material with foaming effect is different than the at least one air void-forming material with defoaming effect, and
      the at least one air void-forming material with foaming effect and the at least one air void-forming material with defoaming effect are present in the air void-forming agent in amounts such that, when the air void-forming agent is mixed into a cementitious system, the air content in the cementitious system changes within 40 minutes after the end of the mixing process by not more than approximately 13% of the original air content.

2. Air void-forming agent according to claim 1, wherein the air void-forming agent contains two air void-forming materials with foaming effect.

3. Air void-forming agent according to claim 1, wherein one of the air void-forming materials with foaming effect is tall oil.

4. Air void-forming agent according to claim 2, wherein the second of the air void-forming materials with foaming effect is a surfactant.

5. Air void-forming agent according to claim 1, wherein the at least one air void-forming material with defoaming effect is a surfactant.

6. Air void-forming agent according to claim 1, wherein the air void-forming agent comprises a preservative.

7. Air void-forming agent according to claim 1, wherein the agent contains 0.02 to 5.00% by weight of the at least one air void-forming material with foaming effect, 0.02 to 5.00% by weight of the at least one air void-forming material with defoaming effect, 80-99.9% by weight of water, optionally 0.05 to 1.0% by weight of lye, and optionally 0.01 to 0.5% by weight of preservative.

8. A method of forming air voids in a cementitious system, the method comprising:
   mixing the air-void forming agent according to claim 1 into the cementitious system.

9. The method according to claim 8, wherein the cementitious system contains polycarboxylate ether as a plasticizer.

10. The method according to claim 8, wherein the water/cement ratio in the cementitious system is 0.2:1 to 0.8:1.

11. The method according to claim 8, wherein the air void-forming agent is mixed in a quantity of 0.01 to 1% by weight with respect to a binder content of the cementitious system.

12. The air void-forming agent according to claim 1, wherein one of the air void-forming materials with foaming effect is distilled tall oil.

13. The air void-forming agent according to claim 1, wherein the at least one air void-forming material with defoaming effect is an anionic surfactant.

14. The air void-forming agent according to claim 1, wherein the at least one air void-forming material with foaming effect and/or the at least one air void-forming material with defoaming effect includes at least one amide ethoxylate or amine ethoxylate.

15. An air void-forming agent comprising:
   at least one air void-forming material with foaming effect,
   at least one air void-forming material with defoaming effect, and
   water,
   wherein:
      the at least one air void-forming material with foaming effect is different than the at least one air void-forming material with defoaming effect,
      the at least one air void-forming material with foaming effect and/or the at least one air void-forming material with defoaming effect includes at least one amide ethoxylate or amine ethoxylate, and
      the at least one air void-forming material with foaming effect and the at least one air void-forming material with defoaming effect are present in the air void-forming agent in amounts such that, when the air void-forming agent is mixed into a cementitious system, the air content in the cementitious system changes within 40 minutes after the end of the mixing process by not more than approximately 13% of the original air content.

16. The air void-forming agent according to claim 1, wherein the at least one air void-forming material with foaming effect and the at least one air void-forming material with defoaming effect are present in the air void-forming agent in amounts such that, when the air void-forming agent is mixed into the cementitious system, the air content in the cementitious system increases within 40 minutes after the end of the mixing process by a non-zero amount not more than approximately 13% of the original air content.

17. The air void-forming agent according to claim 15, wherein the at least one air void-forming material with foaming effect and the at least one air void-forming material with defoaming effect are present in the air void-forming agent in amounts such that, when the air void-forming agent is mixed into the cementitious system, the air content in the cementitious system increases within 40 minutes after the end of the mixing process by a non-zero amount not more than approximately 13% of the original air content.

18. An air void-forming agent comprising:
   at least one air void-forming material with foaming effect selected from the group consisting of tall oil, fatty acids, anionic surfactants, fatty alcohol sulfates, amino acid derivatives, phosphates, amphoteric compounds, alkylphenol ethoxylates, amide ethoxylates, and amine ethoxylates;
   at least one air void-forming material with defoaming effect selected from the group consisting of fatty alcohol ether sulfates, phosphates, amphoteric compounds, amide ethoxylates, and amine ethoxylates; and
   water,
   wherein:
      the at least one air void-forming material with foaming effect is different than the at least one air void-forming material with defoaming effect, and
      the at least one air void-forming material with foaming effect and the at least one air void-forming material with defoaming effect are present in the air void-forming agent in amounts such that, when the air void-forming agent is mixed into a cementitious system, the air content in the cementitious system increases within 40 minutes after the end of the mixing process by a non-zero amount not more than 20% of the original air content.

\* \* \* \* \*